US009465648B2

(12) United States Patent
Karp et al.

(10) Patent No.: US 9,465,648 B2
(45) Date of Patent: Oct. 11, 2016

(54) DISTRIBUTED TRANSACTION PROCESSING THROUGH COMMIT MESSAGES SENT TO A DOWNSTREAM NEIGHBOR

(75) Inventors: Alan H. Karp, Palo Alto, CA (US);
Wojciech Golab, Mountain View, CA (US); Terence P. Kelly, Palo Alto, CA (US); Dhruva Chakrabarti, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 328 days.

(21) Appl. No.: 13/563,595

(22) Filed: Jul. 31, 2012

(65) Prior Publication Data
US 2014/0040898 A1   Feb. 6, 2014

(51) Int. Cl.
*G06F 15/16* (2006.01)
*G06F 9/46* (2006.01)
*H04L 12/803* (2013.01)
*H04L 12/721* (2013.01)

(52) U.S. Cl.
CPC .............. *G06F 9/466* (2013.01); *H04L 45/70* (2013.01); *H04L 47/125* (2013.01)

(58) Field of Classification Search
CPC ..... H04L 29/06; H04L 29/08; H04L 47/125; H04L 47/29
USPC ........................................................ 709/202
See application file for complete search history.

(56) References Cited

U.S. PATENT DOCUMENTS

| 6,009,405 A | 12/1999 | Leymann et al. | |
|---|---|---|---|
| 6,510,465 B1 * | 1/2003 | Bilansky | H04L 29/06 370/431 |
| 6,788,648 B1 * | 9/2004 | Peterson | G06F 9/5083 370/252 |
| 6,823,355 B1 * | 11/2004 | Novaes | G06F 9/466 707/999.01 |
| 7,124,415 B1 * | 10/2006 | Luft | 719/317 |
| 7,213,049 B2 * | 5/2007 | Felt et al. | 709/203 |
| 2002/0152374 A1 * | 10/2002 | Mayfield | 713/153 |
| 2003/0046342 A1 * | 3/2003 | Felt | G06F 9/466 709/203 |
| 2004/0148289 A1 * | 7/2004 | Bamford et al. | 707/10 |
| 2005/0102400 A1 * | 5/2005 | Nakahara et al. | 709/225 |
| 2005/0125798 A1 * | 6/2005 | Peterson | 718/105 |
| 2006/0010243 A1 * | 1/2006 | DuRee | H04L 12/4641 709/230 |
| 2006/0069751 A1 * | 3/2006 | Felt et al. | 709/219 |
| 2006/0095438 A1 * | 5/2006 | Fachan et al. | 707/10 |
| 2006/0143186 A1 * | 6/2006 | Whyte | G06F 9/466 |
| 2007/0168301 A1 * | 7/2007 | Eisner | G06F 9/546 705/79 |
| 2007/0288555 A1 * | 12/2007 | Felt et al. | 709/203 |
| 2008/0005220 A1 * | 1/2008 | Tsunakawa | G06F 9/466 709/201 |
| 2008/0075040 A1 * | 3/2008 | Jen | 370/329 |
| 2008/0235245 A1 * | 9/2008 | Huras et al. | 707/10 |
| 2008/0301246 A1 * | 12/2008 | Gkantsidis | H04L 29/06 709/206 |
| 2009/0144750 A1 * | 6/2009 | Little | G06F 13/385 719/313 |

(Continued)

OTHER PUBLICATIONS

Burckhardt et al., "Eventually Consistent Transactions," Jan. 6, 2012, Microsoft Corporation, 15 p.

(Continued)

*Primary Examiner* — Razu A Miah
(74) *Attorney, Agent, or Firm* — Conley Rose, P.C.

(57) ABSTRACT

A system includes an initiator and processing nodes. The initiator distributes portions of a transaction among the processing nodes. Each processing node has at least one downstream neighbor to which the processing node sends commit messages. The commit messages include a commit status of the processing node. The downstream neighbor is also a processing node.

14 Claims, 4 Drawing Sheets

(56) References Cited

U.S. PATENT DOCUMENTS

| | | | |
|---|---|---|---|
| 2009/0300022 A1* | 12/2009 | Little | G06F 17/30371 |
| 2010/0017642 A1* | 1/2010 | Myers | G06F 11/0709 |
| | | | 714/2 |
| 2010/0036956 A1* | 2/2010 | Nishikawa | 709/226 |
| 2010/0077088 A1* | 3/2010 | Hyun et al. | 709/228 |
| 2010/0166005 A1* | 7/2010 | Jounay | H04L 45/502 |
| | | | 370/401 |
| 2011/0041006 A1* | 2/2011 | Fowler | G06F 9/466 |
| | | | 714/10 |
| 2012/0023066 A1 | 1/2012 | Bourbonnais et al. | |

OTHER PUBLICATIONS

Wang et al., "A Ring-Based Decentralized Collaborative Non-Blocking Atomic Commit Protocol," 2008 IEEE/WIC/ACM International Conference on Web Intelligence and Intelligent Agent Technology, Copyright 2008 IEEE, 4 p.

* cited by examiner

| Step | 1 | 2 | 3 | 4 | 5 | 6 |
|---|---|---|---|---|---|---|
| 0 | 111111 | 111111 | 111111 | 111111 | 111111 | 111111 |
| 1 |  | 101111 |  |  | 111101 |  |
| 2 | 001111 |  | 100111 | 111001 |  | 111100 |
| 3 | 001100 | 000111 | 100001 | 100001 | 111100 | 001100 |
| 4 | 000100 | 000011 | 000001 | 100000 | 000000 |  |
| 5 | 000000 | 000000 | 000000 | 000000 |  | 000000 |

FIG. 2

DISTRIBUTED TRANSACTION PROCESSING THROUGH COMMIT MESSAGES SENT TO A DOWNSTREAM NEIGHBOR

BACKGROUND

A distributed transaction is a transaction that has more than one portion to be performed by different processing entities such as computers. The portions of a distributed transaction should be atomic, that is unless each portion is performed, none should be performed. For example, transferring one hundred dollars from account A to account B can be divided into two portions: withdrawing one hundred dollars from account A and depositing one hundred dollars into account B. Neither of the two portions should be performed unless the other can be performed as well. For example, if the funds can be withdrawn from account A, but not deposited in account B, then the funds should not be withdrawn from account A. Considering that an error may occur during any portion of a distributed transaction, which may be divided into hundreds of portions, efficient and robust distributed transaction processing is desired.

BRIEF DESCRIPTION OF THE DRAWINGS

For a detailed description of exemplary embodiments of the invention, reference will now be made to the accompanying drawings in which:

FIG. 2 illustrates propagation of commit statuses in a distributed transaction processing system in accordance with at least some illustrated examples;

NOTATION AND NOMENCLATURE

Figure 1:
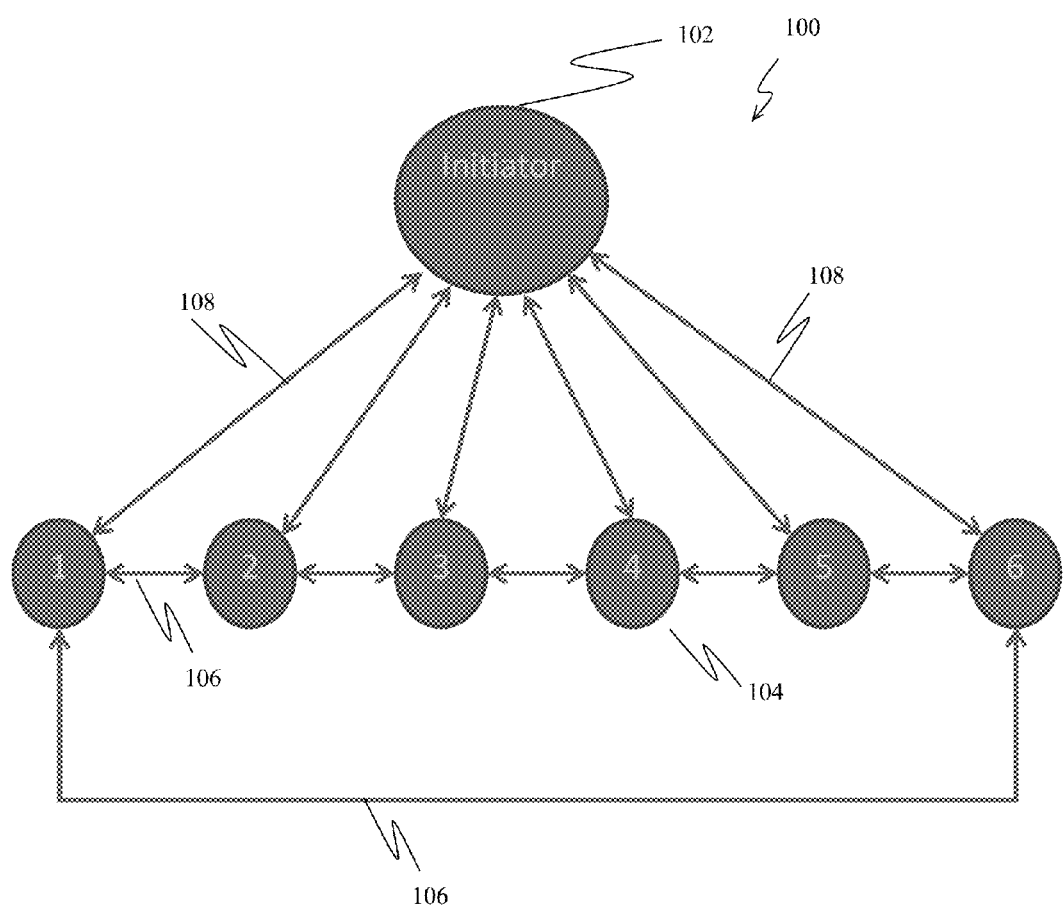
FIG. 1 illustrates a distributed transaction processing system in accordance with at least some illustrated examples.

Certain terms are used throughout the following description section and claims section to refer to particular system components. However, different entities may refer to a component by different names. This document does not intend to distinguish between components that differ in name but not function. The terms "including" and "comprising" are used herein an open-ended fashion, and thus should be interpreted to mean "including, but not limited to." Also, the term "couple" or "couples" is intended to mean either an indirect, direct, optical, wireless, or electrical connection.

DETAILED DESCRIPTION

The following discussion is directed to various examples of the invention. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be exemplary, and not intended to intimate that the scope of the disclosure, including the claims, is limited to that example.

A two-phase commit protocol uses a coordinator to signal to processing nodes whether to commit an executed portion of a transaction to durable memory or abort (roll back) the transaction. Processing nodes execute portions of the transaction and store the result in temporary memory. "Committing" refers to storing the result of the executed transaction in longer term, or durable, memory. The coordinator may receive the transaction, divide the transaction according to the capabilities of processing nodes, and signal for the processing nodes to commit once the coordinator has received a message from each processing node. The entire process is divided into two phases.

In the commit-request phase (or voting phase), the coordinator prepares the processing nodes by sending each processing node a portion of the transaction, sending a query to commit to each processing node, and waiting for a reply (or vote) from each processing node. A processing node votes to commit if the processing node's portion has executed properly, and the processing node votes to abort if a problem has been detected with the portion. Each processing node writes an entry to its undo log and an entry to its redo log.

In the commit phase, the coordinator decides whether to commit or abort the transaction based on the results of the voting phase. The coordinator notifies all the processing nodes of the decision by sending a commit or abort message to all the processing nodes. Next, the processing nodes either commit or abort their portion of the transaction based on the decision of the coordinator. If the decision was to commit, each processing node commits the operation, and releases all the locks on data registers and resources held for temporary memory during the transaction. Each processing node sends an acknowledgment to the coordinator.

If the decision was to abort, the coordinator sends a rollback message to all the processing nodes. Each processing node undoes the transaction using the undo log, and releases all the locks on data registers and resources held for temporary memory during the transaction. Each processing node sends an acknowledgement to the coordinator.

However, the two-phase commit protocol is not resilient to all possible failure configurations, and in some cases user intervention is needed to remedy an outcome. Specifically, a two-phase commit protocol cannot dependably recover from a failure of both the coordinator and a processing node member during the commit phase. If only the coordinator had failed, and no processing node members have received a commit message, it could safely be inferred that no commit occurred. If, however, both the coordinator and a processing node member fail, it is possible that the failed processing node member was the first and only to be notified, and had actually performed the commit. As such, the two-phase commit protocol is considered a blocking protocol because if the coordinator and a processing node fail permanently, some processing nodes will never resolve their transactions. After a processing node has sent an agreement message to the coordinator, it will hold locks on registers and memory until a commit or rollback is received. To accommodate recovery from failure, the processing nodes log various states in log records, which can later be accessed for recovery. Though usually intended to be used infrequently, recovery procedures comprise a substantial portion of the two-phase commit protocol, due to many possible failure scenarios.

In the first phase of a three-phase commit protocol, the coordinator sends a query message to the processing nodes asking if the processing nodes can commit. Next, the coordinator moves to a waiting state. If there is a failure, timeout, or if the coordinator receives a "No" reply from any processing node while in the waiting state, the coordinator aborts the transaction and sends an abort message to all processing nodes. If the coordinator receives "Yes" messages from all the processing nodes within the time window allotted for the waiting state, the coordinator sends pre-commit messages to all processing nodes requesting the processing nodes to prepare for committing. Next, the coordinator moves to a prepared state. If there is a failure, timeout, or if the coordinator fails to receive an acknowledgement from any processing node while in the prepared state, the coordinator aborts the transaction and sends an abort message to all processing nodes. If the coordinator receives an acknowledgement from each processing node in the prepared state, it will move to the commit state. Finally, the coordinator sends an order to commit to each processing node. Next, the coordinator moves to a commit state, and waits for a message of successful committing from each processing node.

The three-phase commit protocol eliminates the blocking problem caused by failure of the coordinator and a processing node by introducing the prepared-to-commit state. The coordinator will not send out a commit message until all processing node members have acknowledged that they are prepared to commit. If the coordinator fails before sending pre-commit messages, the processing nodes will unanimously agree that the operation was aborted. Unlike the two-phase commit protocol, a three-phase commit protocol is non-blocking. Specifically, the three-phase commit protocol places an upper bound on the amount of time allowed before a processing node either commits or aborts. As such, if a given processing node is attempting to commit and holds some resource locks, it will release the locks after the timeout.

However, the three-phase commit protocol is not without drawbacks. Specifically, network usage greatly increases using the three-phase commit protocol especially for more complex tasks using hundreds or thousands of processing nodes. Additionally the complexity increase of the protocol affects areas such as development time, troubleshooting, and maintenance tasks. As such, robust yet efficient distributed transaction processing remains desirable. Finally, there is no formal safety proof for the three-phase commit protocol.

FIG. 1 illustrates a system 100 comprising an initiator 102 and a plurality of processing nodes 104 (labeled 1-6 in FIG. 1). The initiator 102 may distribute portions of a transaction among the processing nodes 104, but the initiator 102 does not behave as a coordinator described above. Specifically, the initiator 102 does not decide whether to commit or abort, and does not signal to the processing nodes 104 whether to commit or abort. Each processing node 104 may have at least one downstream neighbor to which the processing node 104 sends commit messages 106. For example, the processing node labeled "2" is downstream from the processing node labeled "1," and processing node 1 may send commit messages 106 to processing node 2 represented by the arrow 106 between processing node 1 and processing node 2. Similarly, processing node 1 is upstream from processing node 2. In the example of FIG. 1, each processing node 104 has two downstream neighbors and two upstream neighbors. However, in other examples the configuration may be altered.

Commit messages 106 are messages that include a commit status. For example, the commit message 106 from processing node 1 to processing node 2 may include the commit status of processing node 1. The commit status of other processing nodes 104 may be included as well. A commit status is data associated with a particular processing node 104 that identifies the status of that processing node 104 with regard to its portion of the transaction. For example, the status of a processing node 104 may be ready to commit to durable memory, not ready to commit to durable memory, committed to durable memory, or aborted. The commit status may take the form of a binary number, an integer, a string, or the like.

Each processing node 104 may send its downstream neighbor(s) commit messages 106 containing an updated commit status after executing the processing node's 104 portion of the transaction. Similarly, each processing node 104 may have at least one upstream neighbor from which the processing node 104 receives commit messages 106 including an updated commit status of at least one upstream neighbor. In order to keep track of the commit status of other processing nodes 104, each processing node 104 may include a commit status data structure that records and identifies the commit status of the other processing nodes 104 or all processing nodes 104. For example, the commit status data structure may identify which processing nodes are ready to commit. Commit messages 106 may be sent after any update to a processing node's 104 commit status data structure. For example, if a processing node 104 receives a commit message 106 from an upstream neighbor that contains newer information that the information in the processing's nodes commit status data structure, the processing node 104 may update its commit status data structure with the newer information, and send a commit message 106 containing the newer information to its downstream neighbors.

In at least one example, none of the processing nodes 104 is elected as a leader. That is, none of the processing nodes 104 is selected by other processing nodes 104 for a unique function with regard to the distributed transaction. In at least one example, the initiator 102 does not command the processing nodes 104 to commit. Rather, each processing node 104 commits its portion of the transaction after both executing the processing node's 104 portion of the transaction and receiving a commit message from another processing node 104 indicating that at least every other processing node 104 is ready to commit or has committed. Such a processing node 104 is not elected or selected by the other processing nodes, but may simply be the first or last processing node to commit. Considering the above, network traffic is greatly reduced when compared to the two-phase, reduced by five messages considering the examples above, and three-phase protocols, reduced by twenty-nine messages considering the examples above. Further, by reducing communication complexity, but not losing functionality, the disclosed processing of distributed transactions contains fewer failure points. Processing nodes with many upstream and downstream neighbors are strongly connected and create robustness in transaction processing. Specifically, the failure points described in two-phase protocol and three-phase protocol are ameliorated and even eliminated as the system gains strongly connected processing nodes.

A network link between two processing nodes 104 may fail during operation. If the failure is temporary, messages may be resent until acknowledged. If the failure is permanent, alternate routing around the failure point may be implemented. In a "fail stop", a processing node 104 may stop sending and receiving messages, which includes writing to durable storage. In a "crash recovery", a processing node 104 may temporarily stop sending and receiving messages, and restart from an earlier state.

The initiator 102 may fail. If the initiator 102 fails during setup, the transaction may be aborted or may be retried. If the failure is temporary, the initiator 102 may re-send the transaction information. Any processing node 104 that previously received its data continues normally. If a second initiator is initialized and the first recovers, processing nodes will receive two sets of transaction data. If the two sets of data are identical, the nodes may ignore the second set. If they are different, the processing nodes 104 may abort unless they have already decided to commit, in which case the processing nodes 104 may ignore the second request.

If a processing node 104 fails during setup, the initiator 102 may abort the transaction in at least one example. If a processing node 104 fails before completing its portion, the processing node 104 may restart from its initial state updated with incoming messages.

A processing node 104 may execute, forward its updated status, but fail before making the commit data durable in at least one example. If this failure is temporary, the processing node 104 will make its commit data durable when it recovers. If the failure is permanent, the initiator 102 may assume responsibility for moving the commit data to durable storage. The initiator 102 may detect such failures either by detecting a lock that is not released, by pinging all processing nodes 104 for liveness before reporting that the transaction committed, or by requiring all processing nodes 104 send the initiator 102 a message after writing to durable storage. In some configurations, such a requirement may increase the total message count for a transaction but provide more detailed monitoring of the transaction.

The link between a processing node 104 and the initiator 102 may fail. If the failure occurs during setup, the initiator 102 may abort the transaction or initialize a new processing node 104 to replace the unreachable node. If the failure is temporary, the initiator 102 may not inform the processing node on the now recovered link of the transaction, because the new processing node 104 has been initialized. Such a failure may be mitigated by more than one processing node 104 communicating the decision to the initiator 102. Also, a rollback based on log records may be used to undo any effects of an uncertain commit.

FIG. 2 illustrates the propagation of commit statuses of processing nodes 1-6 of FIG. 1. The rows of FIG. 2 represent time, i.e., step 1 is later than step 0, step 2 is later than step 1, etc. The columns of FIG. 2 represent the different processing nodes and each processing node's 104 internal model, or data structure, of the commit status of itself and other processing nodes 104. Each cell contains 6 bits, one for each processing node. A 1-bit indicates the processing node in that position is not ready to commit, and a 0-bit indicates the processing node in that position is ready to commit. For purposes of discussion, processing node 1 is represented by the left most bit in each cell, and processing node 6 is represented by the right most bit in each cell with the intervening processing nodes represented by the corresponding intervening bits.

At step 0, no processing node 104 has finished executing and is ready to commit. For purposes of discussion, after step 0 only the changed cells are shown. If a cell is blank, then it contains the same value as shown in the previous step. At step 1, processing nodes 2 and 5 have executed their portions of the transaction and are ready to commit. Processing node 2 has updated its data structure to show a 0-bit in the second position from the left. Processing node 2 sends a commit message to its downstream neighbors: processing nodes 1 and 3. Processing node 5 has updated its data structure to show a 0-bit in the fifth position from the left. Processing node 5 sends a commit message to its downstream neighbors: processing nodes 6 and 4.

At step 2, processing nodes 1, 3, 4, and 6 have executed their portions of the transaction and are ready to commit. These processing nodes have updated their data structures to show a 0-bit in the corresponding position. Processing nodes 1 and 3 have received the commit message from processing node 2 and have updated their data structures to show a 0-bit in the second position from the left as well. Processing nodes 6 and 4 have received the commit message from processing node 5 and have similarly updated their data structures. Any processing node 104 that has received an updated value or has changed its own value sends a commit message to its downstream neighbors. Step 3 continues the propagation process, and at step 4 processing node 5 commits its portion of the transaction because the value in its data structure represents that every other node including processing node 5 is ready to commit. At step 5, processing nodes 1, 2, 3, 4, and 6 commit their portion of the transaction.

In at least one example, each processing node 104 performs a logical AND between its current binary value and a received binary value. If the result is different from its current value, the processing node updates its current value to the result and sends the result to its downstream neighbors. As such, 0-bits are propagated throughout the processing nodes. Should a processing node fail permanently before committing, the portion of the transaction assigned to the processing node is restarted on another processing node in at least one example. If the processing node has already informed its neighbors of committing but has not committed, a recovery task may move the appropriate data to durable storage in at least one example.

Figure 3:
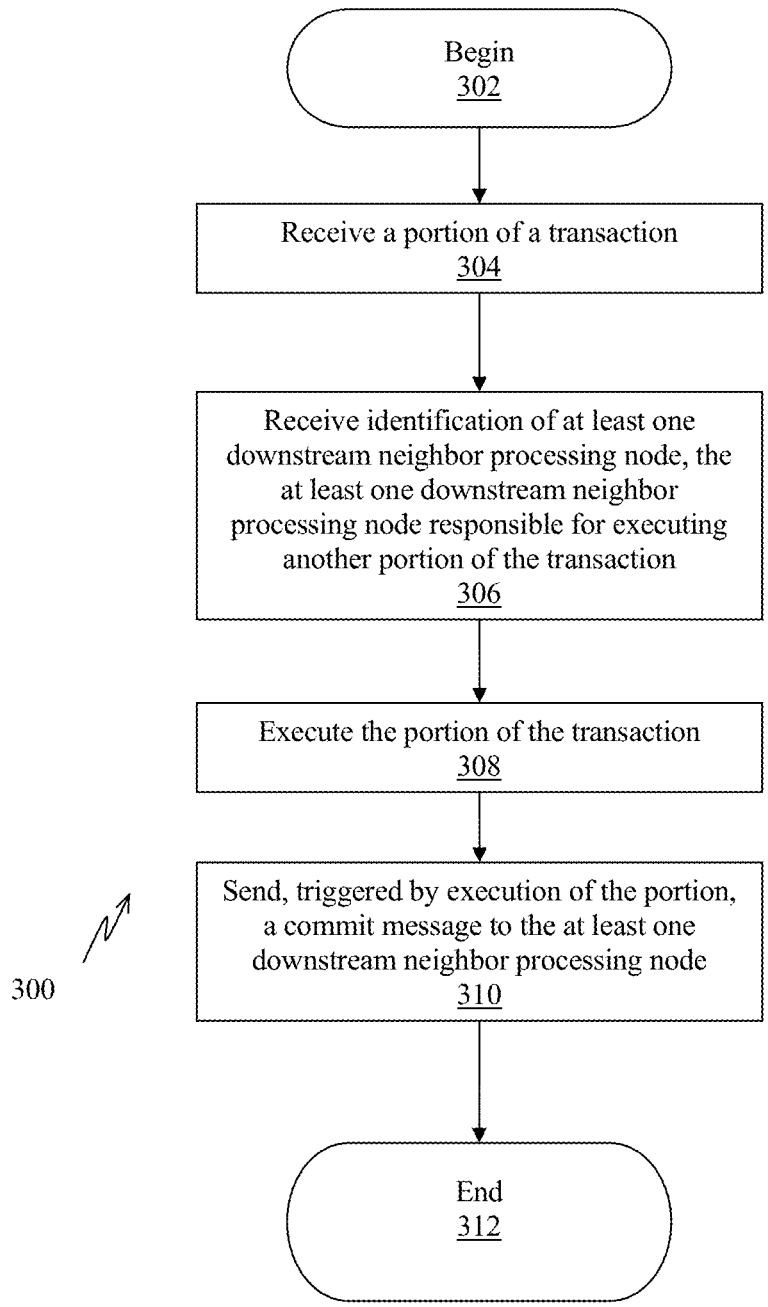
FIG. 3 illustrates a method of distributed transaction processing in accordance with at least some illustrated examples.

FIG. 3 illustrates a method 300 of performing a peer-to-peer commit protocol beginning at 302 and ending at 312. At 304, a portion of a transaction is received. At, 306, identification of at least one downstream neighbor processing node is received. The at least one downstream neighbor processing node identified is responsible for executing another portion of the transaction. At 308, the portion of the received transaction is executed. At 310, execution of the portion of the transaction triggers a commit message to be sent to the at least one downstream neighbor processing node. In at least one example, the commit message includes a commit status for each processing node receiving a portion of the transaction.

The method 300 may also include receiving another commit message from an upstream neighbor processing node and updating a commit status data structure with information from the second commit message in at least one example. This second commit message may indicate that every processing node responsible for any portions of the transaction is ready to commit. As such, the method 300 may include committing the portion of the transaction based on the second commit message. Alternatively, the second commit message may indicate that at least one processing node responsible for a portion of the transaction has aborted. As such, the method 300 may include aborting the portion of the transaction as well based on the second commit message.

The method 300 may also include sending yet another commit message triggered by updating the commit status data structure in at least one example. This third message is sent to at least one downstream neighbor processing node, and the third message contains the information received in the second commit message.

Figure 4:
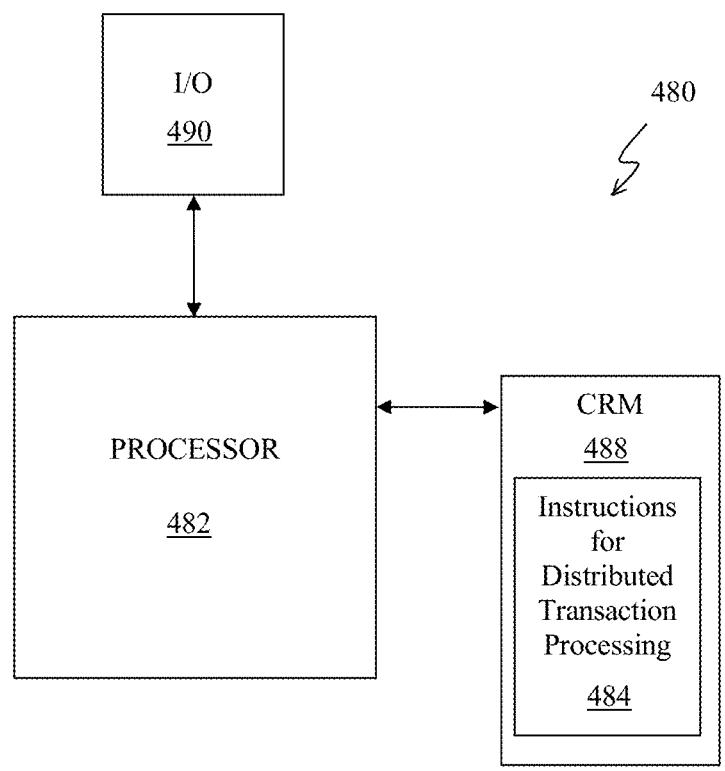
FIG. 4 illustrates a computer readable storage device for implementing distributed transaction processing in accordance with at least some illustrated examples.

The system described above may be implemented on any particular machine or computer with sufficient processing power, memory resources, and throughput capability to handle the necessary workload placed upon the computer. FIG. 4 illustrates a non-transitory computer-readable storage device 480 comprising instructions that, when executed, cause one or more processors 482 to perform any action described herein. The computer system 480 may be suitable for implementing one or more examples disclosed herein. The computer system 480 may include a hardware processor 482 (which may be referred to as a central processor unit or CPU) that is in communication with memory devices including storage 488, and input/output (I/O) 490 devices. The processor may be implemented as one or more CPU chips.

In various embodiments, the storage 488 may include a non-transitory storage device such as volatile memory (e.g., RAM), non-volatile storage (e.g., Flash memory, hard disk drive, CD ROM, etc.), or combinations thereof. The storage 488 may include computer-readable software or instructions 484 that are executed by the processor 482. One or more of the actions described herein are performed by the processor 482 during execution of the software 484.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   an initiator; and
   a plurality of processing nodes, the initiator to distribute portions of a transaction among the processing nodes;
   wherein each processing node out of the plurality of processing nodes has at least one downstream neighbor to which the processing node sends commit messages comprising a commit status of the processing node, the at least one downstream neighbor comprising a processing node out of the plurality of processing nodes;
   wherein each processing node has a commit status data structure to track the commit status of each of the plurality of processing nodes; and
   wherein each processing node commits its portion of the transaction after both executing the processing node's portion of the transaction and receiving a commit message from another processing node indicating that at least every other processing node out of the plurality of processing nodes is ready to commit.

2. The system of claim 1, wherein each processing node out of the plurality of processing nodes sends its at least one downstream neighbor commit messages after executing the processing node's portion of the transaction.

3. The system of claim 1, wherein each processing node out of the plurality of processing nodes has at least one upstream neighbor from which the processing node receives commit messages comprising a commit status of the at least one upstream neighbor, the at least one downstream neighbor comprising a processing node out of the plurality of processing nodes.

4. The system of claim 1, wherein the commit status data structure identifies which processing nodes out of the plurality of processing nodes are ready to commit.

5. The system of claim 4, wherein each processing node out of the plurality of processing nodes sends its downstream neighbors commit messages after updating the processing node's commit status data structure.

6. The system of claim 1, wherein none of the processing nodes is elected as a leader.

7. The system of claim 5, wherein at least some of the processing nodes commit based on the commit messages received from downstream neighbors of such processing nodes, but the initiator does not command such processing nodes to commit.

8. A non-transitory computer-readable storage device comprising instructions that, when executed, cause one or more processors to:
   execute a portion of a transaction;
   update a commit status data structure, the commit status data structure being to track the commit status of a plurality of processing nodes having other portions of the transaction;
   send, triggered by execution of the portion, a commit message to at least one downstream neighbor processing node, the commit message indicating readiness to commit a result of execution of the portion to durable memory;
   wherein the commit message comprises commit status for a plurality of processing nodes that receive a portion of the transaction; and
   receive a second commit message from an upstream neighbor processing node and update the commit status data structure with information from the second commit message; and
   send, triggered by updating the commit status data structure, a third commit message to the at least one downstream neighbor processing node, the third commit message containing the information received from the second commit message.

9. The device of claim 8, further causing the one or more processors to receive a second commit message indicating every processing node responsible for any portions of the transaction is ready to commit, and based on the second commit message, commit a result of execution of the portion to durable memory.

10. The device of claim 8, further causing the one or more processors to receive a second commit message indicating at least one processing node responsible for a portion of the transaction has aborted, and based on the second commit message, abort the portion.

11. A method, comprising:
    receiving, by a first processing node, a portion of a transaction;
    receiving, by the first processing node, identification of at least one downstream neighbor processing node, the at least one downstream neighbor processing node responsible for executing another portion of the transaction;
    executing, by the first processing node, the portion of the transaction;
    update a commit status data structure, the commit status data structure being to track the commit status of a plurality of processing nodes having other portions of the transaction;
    sending, by the first processing node and triggered by execution of the portion, a first commit message to the at least one downstream neighbor processing node; and
    receiving, by the first processing node and from a downstream neighbor processing node also executing a portion of the transaction, a second commit message indicating from a plurality of other processing nodes responsible for other portions of the transaction are ready to commit, and based on the second commit message, committing, by the first processing node, the portion of the transaction, wherein the second commit message indicates at least one processing node responsible for a portion of the transaction has aborted, and based on the second commit message, the first processing node aborting the portion.

12. The method of claim 11, wherein the first commit message comprises a commit status for each processing node receiving a portion of the transaction.

13. The method of claim 11, further comprising, based on receipt of the second commit message, updating the commit status data structure with information from the second commit message.

14. The method of claim 13, further comprising sending, triggered by updating the commit status data structure, a third commit message to the at least one downstream neighbor processing node, the third commit message containing the information.

* * * * *